United States Patent [19]

Bennett

[11] Patent Number: 4,807,485
[45] Date of Patent: Feb. 28, 1989

[54] MOTOR DRIVEN CAGING SYSTEM FOR FREE GYROS

[75] Inventor: William E. Bennett, Westlake Village, Calif.

[73] Assignee: Kirkos Development, Ltd., Newbury Park, Calif.

[21] Appl. No.: 81,827

[22] Filed: Aug. 4, 1987

[51] Int. Cl.⁴ .............................................. G01C 19/26
[52] U.S. Cl. ........................................... 74/5.1; 74/36
[58] Field of Search ................... 74/5.1, 5.12, 5.14, 74/36

[56] References Cited

U.S. PATENT DOCUMENTS

| | | | |
|---|---|---|---|
| 2,726,550 | 12/1955 | Radkowski et al. | 74/5.1 |
| 2,727,393 | 12/1955 | Summers | 74/5.1 X |
| 2,786,356 | 3/1957 | Klose | 74/5.1 |
| 2,937,531 | 5/1960 | Gallagher | 74/5.1 |
| 2,940,319 | 6/1960 | Maiorany et al. | 74/5.1 |
| 2,962,901 | 12/1960 | Shirley | 74/5.1 |
| 3,114,269 | 12/1963 | Mills | 74/5.1 |
| 3,477,297 | 11/1969 | Howe | 74/5.1 |
| 3,508,447 | 4/1970 | Shirley | 74/5.1 |

Primary Examiner—Rodney H. Bonck
Attorney, Agent, or Firm—Blakely, Sokoloff, Taylor & Zafman

[57] ABSTRACT

A motor driven caging system for free gyros which cages both the inner and outer gimbals thereof and locks in both the caging and uncaging positions by an over center mechanism is disclosed. The motor drives a crank which in turn drives a somewhat compliant linkage which actuates a cam to first cage the outer gimbal and a fork to then cage the inner gimbal. The crank moves through an angle somewhat over 180 degrees between the caged and uncaged positions, with the caging mechanism having a maximum motion slightly less than that encouraged by the crank extreme, whereby the compliant linkage is elastically deflected as the crank moves past the maximum excursion point to a positive stop soon thereafter. Control of the motor is provided by a switch actuated by the caging mechanism drive as it approaches either the caging position stop or the uncaging position stop.

4 Claims, 6 Drawing Sheets

Fig. 11 CAGING INITIATED

Fig. 12 CAGING COMPLETE

Fig. 13 UNCAGING INITIATED

Fig. 14 CAGING COMPLETE

MOTOR DRIVEN CAGING SYSTEM FOR FREE GYROS

BACKGROUND OF THE INVENTION

1. Field of the Invention

This invention relates to the field of caging systems for free gyroscopes.

2. Prior Art

Various types of caging system are commonly used for free gyroscopes to align the inner and outer gimbals thereof to a predetermined position with respect to the gyroscope frame or case. For the gyros used in missiles and thus intended for one time use only, pyrotechnic devices are frequently used which, when fired, move the caging mechanism from a preset caged condition. Also used are solenoid actuators, particularly for gyros for aircraft which will be repeatedly used, as the solenoid actuators may be operated over and over again as required.

Pyrotechnic devices, when usable, have the advantage of low cost, though have the disadvantage that the device, being usable only once, cannot be tested. Solenoid actuators, on the other hand, while being readily testable and repeatedly usable, have certain characteristics which tend to affect reliability in an adverse manner. By way of example, solenoid devices exhibit a very nonlinear force versus position characteristic, having a minimum pull at the start of actuation and a pull force which may be many times greater at the end of the actuation. Solenoid devices also dissipate substantial power and heat, if energized for substantial periods. Accordingly, when used as the driving force for caging mechanisms, solenoids commonly utilize a mechanical latch to keep the solenoid latched without the continuous application of power, with a spring linkage driving the caging mechanism. The mechanical complexity, the requirement of a second solenoid to release the mechanical latch, the nonlinear forces of both the solenoid and a spring linkage and wear associated therewith tend to limit the life and reliability of such systems.

BRIEF SUMMARY OF THE INVENTION

A motor driven caging system for free gyros which cages both the inner and outer gimbals thereof and locks in both the caging and uncaging positions by an over center mechanism is disclosed. The motor drives a crank which in turns drives a somewhat compliant linkage which actuates a cam to first cage the outer gimbal and a fork to then cage the inner gimbal. The crank moves through an angle somewhat over 180 degrees between the caged and uncaged positions, with the caging mechanism having a maximum motion slightly less than that encouraged by the crank extreme, whereby the compliant linkage is elastically deflected as the crank moves past the maximum excursion point to a positive stop soon thereafter. Control of the motor is provided by a switch actuated by the caging mechanism drive as it approaches either the caging position stop or the uncaging position stop.

DETAILED DESCRIPTION OF THE INVENTION

Figure 1:
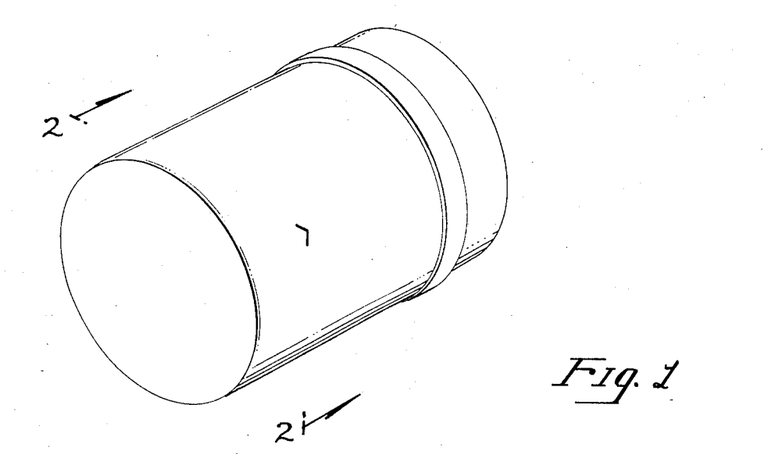
FIG. 1 is a perspective view of a typical two axis free gyro incorporating the caging mechanism of the present invention.

First referring to FIG. 1, a perspective view of one embodiment of the present invention may be seen as typically incorporated within a two axis free gyro. Externally there is no detectable difference between a free gyro incorporating the present invention and those of the prior art. However, as may be seen in the partial cross sections of FIGS. 2 through 5, internally the present invention differs substantially from the prior art in both structure and operation.

Figure 3:
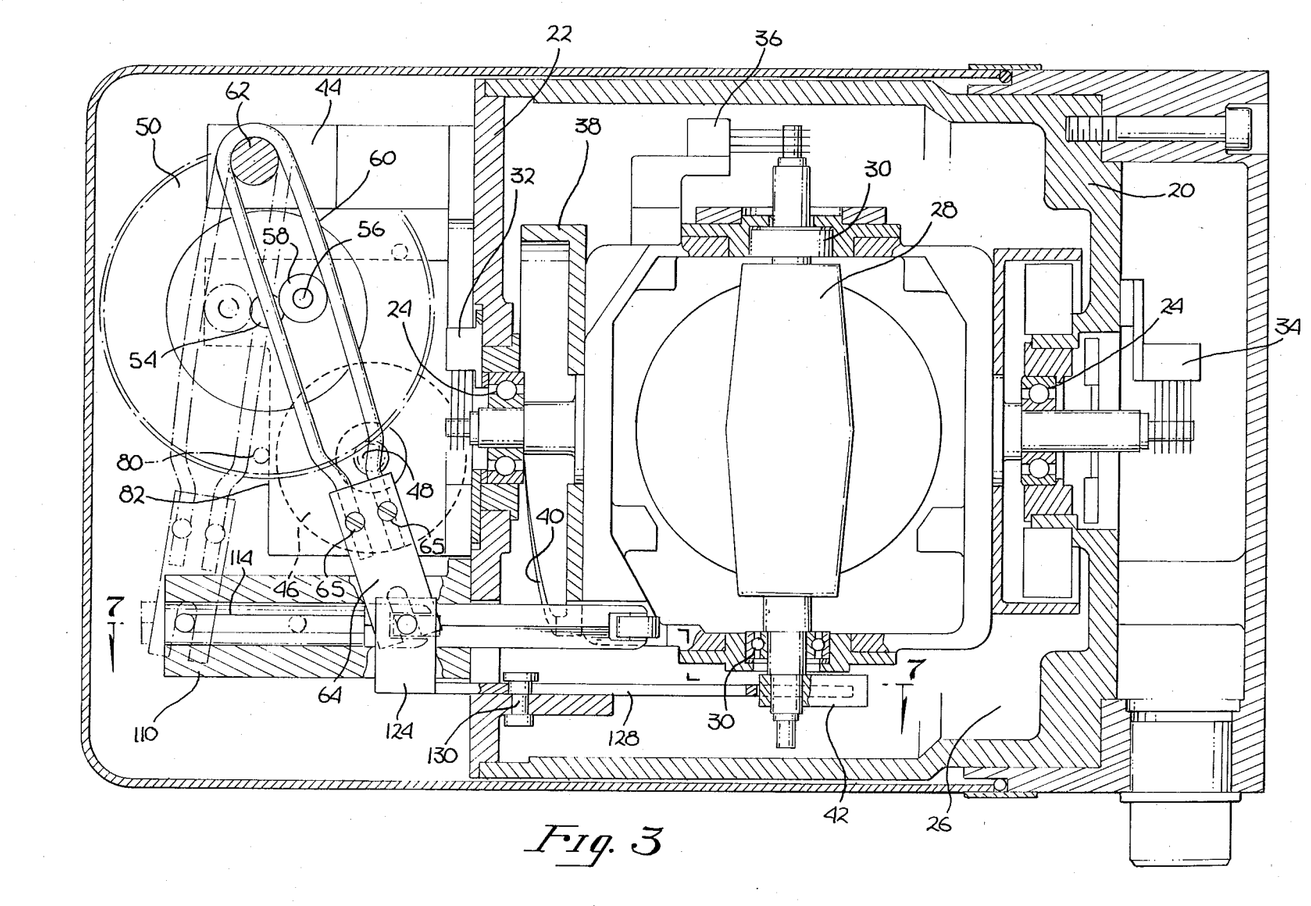
FIG. 3 is a partial cross section taken along line 3—3 of FIG. 2.

As may be seen in FIG. 3, the gimbal structure of the present invention may be the same or very similar to that of the prior art. Supported by a frame 20 and end cap 22 are outer gimbal bearings 24, in turn supporting an outer gimbal 26, which supports an orthogonal inner gimbal 28 on inner gimbal bearings 30, the spin axis of the rotor with the gimbal orientation as shown in FIG. 3 being perpendicular to the figure. Slip ring assemblies 32, 34 and 36 provide electrical coupling for power and the position pick offs as required. Also visible in FIG. 3 is an outer gimbal caging cam 38 having a cam surface 40 concentric with the outer gimbal axis, and an inner gimbal caging cam 42 (see also FIG. 4) rigidly coupled to the inner gimbal. These elements, their fabrication, balancing, etc., are found in conventional two axis free gyros and may be of standard construction when used with the present invention.

Mounted to the end cap 22 is a support 44 which supports and aligns a number of elements of the caging system drive as well as provides positive stops therefor in both the caging and uncaging directions. In particular, a motor 46 (visible in phantom in FIGS. 3 through 5, but probably best illustrated in FIG. 2) provides the basic source of mechanical power for operating the caging system. In the preferred embodiment a servo motor manufactured by Clifton Precision is used, servo motors now being well proven and exhibiting high reliability, and properly energized, being capable of being operated in a stalled or near-stalled condition without damage or overheating. In that regard, one of the advantages of using a motor of this type to actuate a caging mechanism rather than specially designed solenoid actuators or similar devices is that the motor's performance and reliability may be thoroughly proven in other applications before being used in the critical caging application.

The motor 46 has a pinion gear 48 thereon engaging a much larger gear 50 supported through a hub 52 for rotation about a shaft 54. Coupled to the gear 50 through hub 52 is a crank pin 56 with a roller 58 thereon. The roller 58 fits within a hairpin-like spring member 60 supported on a pin 62 in support 44. A formed washer 63 on pin 62 (see FIG. 2) encircles the outer periphery of the spring member 60 to keep the loop in the end of the spring member concentric with the pin 62. The spring member 60 has a fork 64 at the distal end thereof which engages a slide assembly yet to be described, the fork being retained on the spring by a pair of set screws 65.

Figure 2:
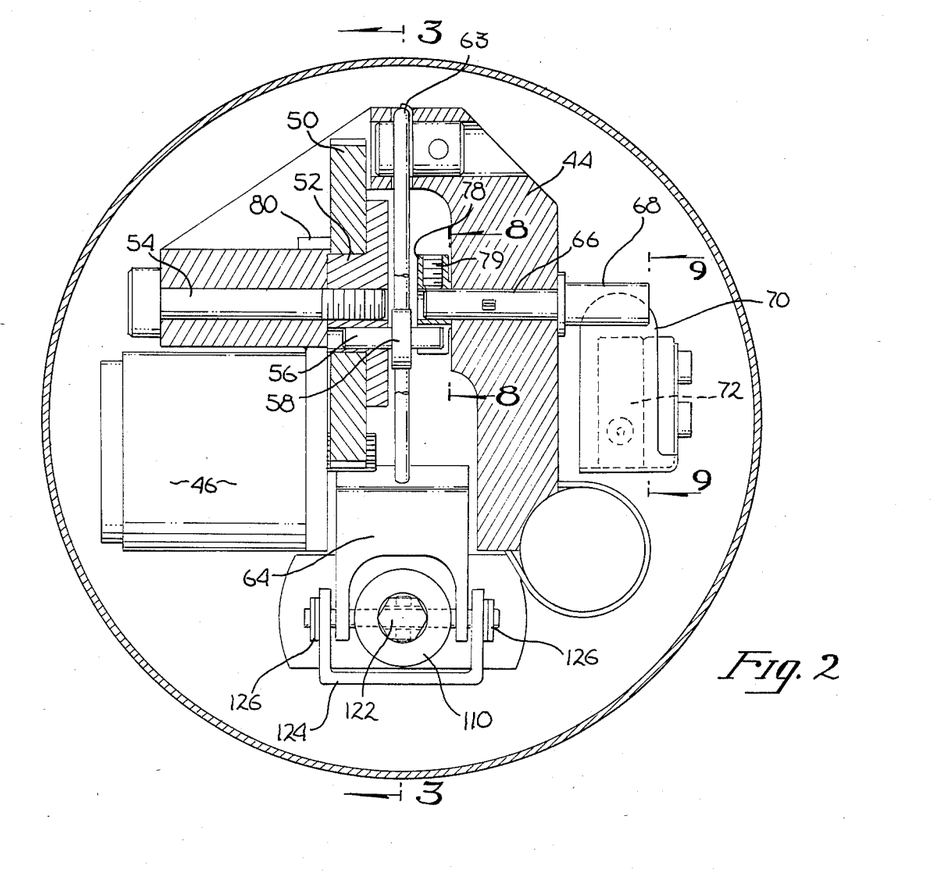
FIG. 2 is a partial cross section taken along line 2—2 of FIG. 1.
Figure 8:
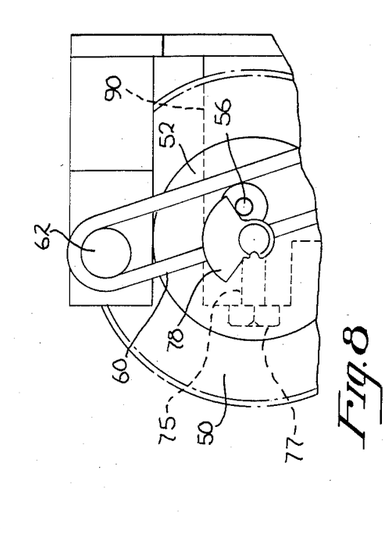
FIG. 8 is a partial cross section taken along line 8—8 of FIG. 2.
Figure 9:
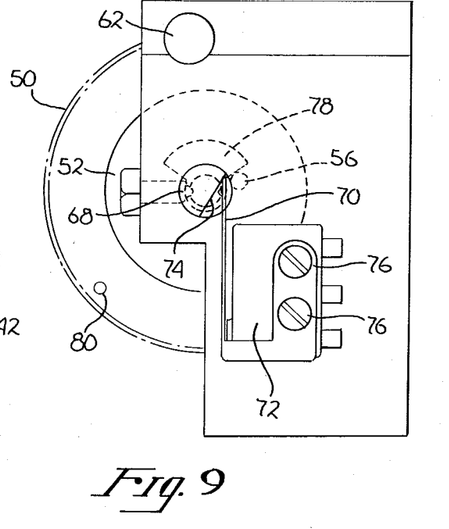
FIG. 9 is a partial cross section taken along line 9—9 of FIG. 2.

As may be seen in FIG. 2, also supported on the support 44 is a pin 66 which has a head 68 thereon which acts as a cam surface to actuate a spring 70 mounted on and controlling a microswitch 72 thereunder. The head 68, as may be best seen in FIG. 9, has a flat region 74 thereon which, on rotation as shown, will engage and depress the spring 70 to actuate the microswitch 72, also supported from the support 44 by screws 76. The pin 66 in turn is retained in position and driven by a drive sector 78 visible in FIG. 2 and best illustrated in FIG. 8. The drive sector is retained on pin 66 by a set screw 79 and rotates directly therewith. Drive sector 78, however, is driven by the crank pin 56 (mounted in the hub of gear 50). The sector member 78 acts as a lost motion drive in the sense that the gear 50 rotates not counterclockwise, but clockwise in the position shown in FIG. 8, rotating slightly over a full 180 degrees before engaging the opposite side of the sector member 78 to rotate the member in the opposite direction. Thus while little rotation of the pin 66 is required to actuate the microswitch, somewhat in excess of 180 degree rotation of the gear, hub and crankpin are required to do so. Also a spring detent (see FIGS. 8 and 9) comprised of a spring loaded ball screw 75 and lock nut 77 will retain the pin 66 in the switch actuated position until positively driven to the switch unactuated position.

Figure 4:
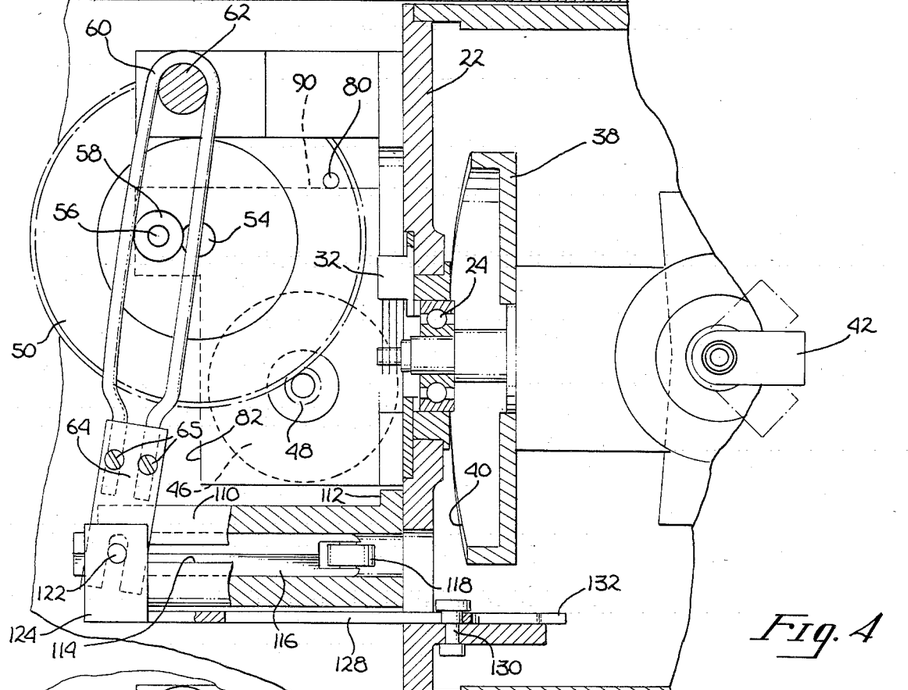
FIGS. 4 and 5 are partial cross sections similar to the partial cross section of FIG. 3, but with the caging mechanism illustrated in different stages of operation.
Figure 5:
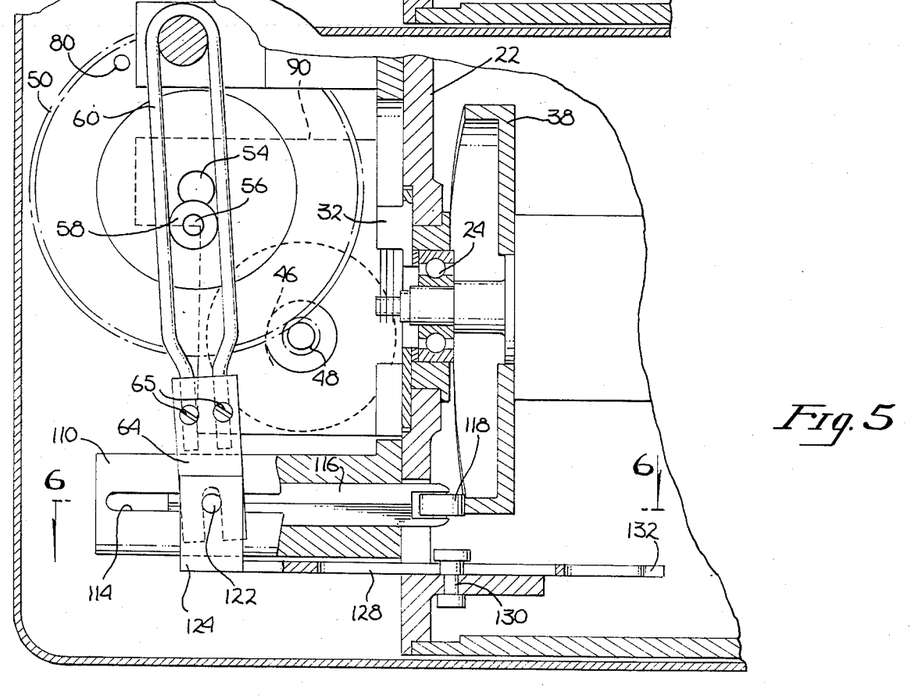
Figure 6:
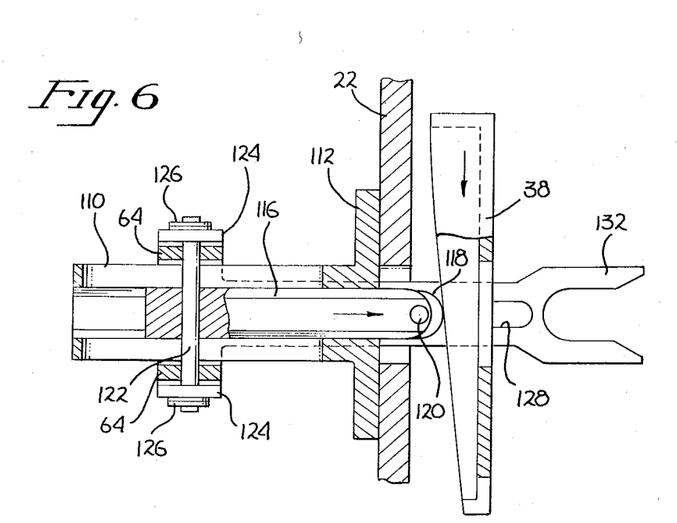
FIG. 6 is a partial cross section taken along line 6—6 of FIG. 5.
Figure 10:
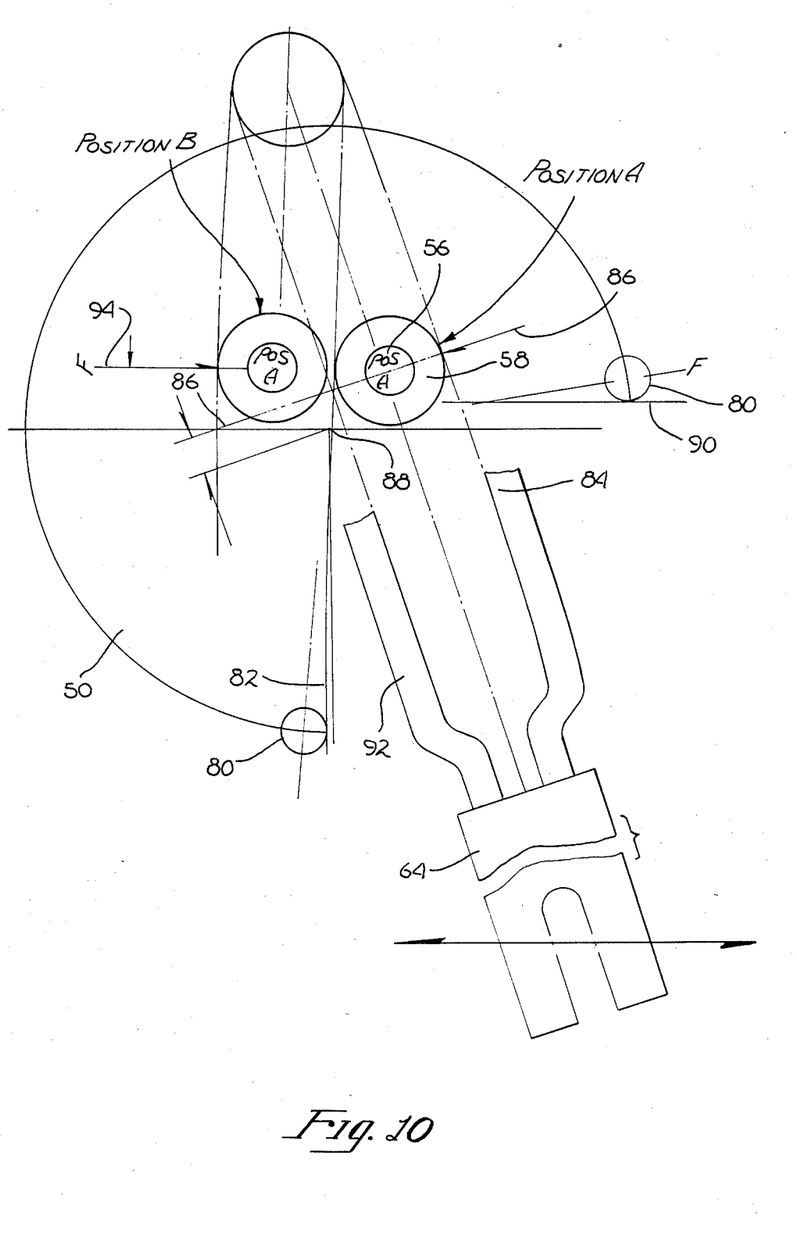
FIG. 10 is a schematic illustration of the over center mechanism and the operation thereof for locking the caging mechanism in the caged and the uncaged positions.

Gear 50 has a stop pin 80 (FIG. 2) therein which provides a positive stop for gear 50 at each limit of the gear rotation. The stop pin 80 is pressed into a hole through the gear 50 so that the inner end of the pin 80 is viewable from the opposite side of the gear as may be seen in FIGS. 3 through 5. FIG. 3 (the solid portion, not the portion shown in phantom) illustrates the position of the gear, drive pin, spring member, etc. in the caged position, with FIG. 4 showing the same in the uncaged position and FIG. 5 illustrating an intermediate position. FIG. 10, on the other hand, is a schematic illustration, illustrating on an expanded scale the particular geometry involved. In particular, in FIG. 3 the gear 50 as viewed in that figure is in its counterclockwise-most position. In this position the stop pin 80 engages region 82 (FIGS. 3 and 10) of the support 44. This corresponds to the caged position of the gyro, at which point microswitch 72 has been actuated and the spring detent engaged. In this position crank 56 and roller 58 are in what is referred to as position A in FIG. 10. As illustrated in that figure, the force on roller 58 from portion 84 of the spring 60 is perpendicular to the spring or along line 86. This force passes above the center 88 of shaft 54 (FIG. 2) supporting the gear hub 52 and thus the gear 50, so that the force from the spring on the roller encourages the gear 50 to rotate in the counterclockwise direction, which rotation of course is prohibited by the engagement of the pin 80 with the wall 82 part of the support 44. In practice the movement of the caging system is limited to something slightly less than that which would be normally encouraged by the fork 64 so that as the crank pin moves toward this caged position, the side of spring 84 which is in engagement with roller 58 will elastically bow under the force of the roller. The net result is that the motor and gear, after passing the maximum bowed condition of the spring, proceeds to the stop and is encouraged to remain there by the spring pressure of the bowed spring arm 84 providing an over center action to retain the mechanism in the caged position, even under reasonable shock and vibration conditions. In this condition the microswitch 72 is actuated.

When uncaging is initiated, the motor rotates gear 50 in a counterclockwise direction through an intermediate position illustrated in FIG. 5 to the uncaged position shown in FIG. 4. In this position the stop pin 80 engages region 90 (FIGS. 4 and 10) of support 44, with the crank pin 56 in roller 58 being in what is referred to in FIG. 10 as position B. In this position side 92 of the spring has been bowed slightly by the caging mechanism before reaching the positive stop in the uncaged position after the maximum spring deflection position so the force along line 94, now above center 88 of the gear, will encourage the gear in a clockwise direction, now retaining the gear in the uncaged position. Consequently, the combination of spring member 60, the positive stops for stop pin 80 in the gear and the limit of motion of the fork 64 by the mechanical caging mechanism results in an over center spring action for both the caged and uncaged positions to retain the mechanism in those positions, respectively.

In the uncaged position of the mechanism, microswitch 72 is actuated with the spring detent retaining the pin 66 in the switch actuated position until caging is complete, at which time the crank pin 56 will cause rotation of pin 66 to move the switch to the unactuated position. The connection of the switch 72 with motor 46 and the power supply and associated circuitry, and the operation thereof is illustrated in FIGS. 11 through 14. The control of the caging mechanism is through connection of a cage line or an uncage line to the power supply, as schematically illustrated by switch 100. While the switch is schematically illustrated as a two position mechanical switch, any switching means, electronic, mechanical or otherwise, which will provide a power pulse of sufficient duration or a continuous voltage to the selected line may be used.

Figure 11:
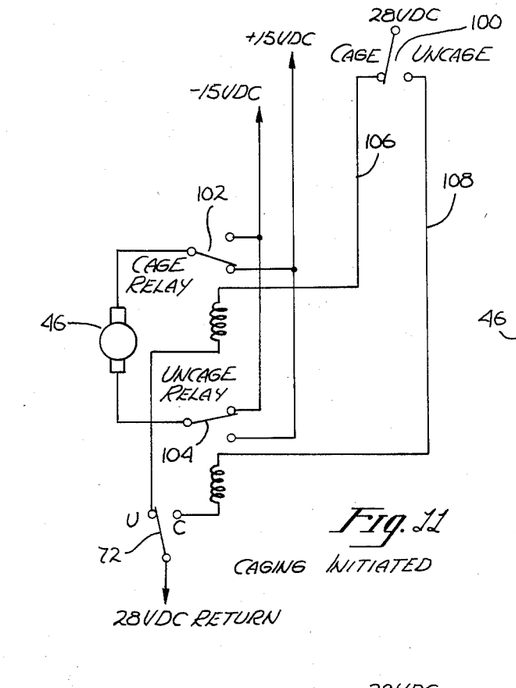
FIGS. 11 through 14 are circuit diagrams illustrating the operation of the caging motor drive circuit for effecting caging and uncaging.
Figure 12:
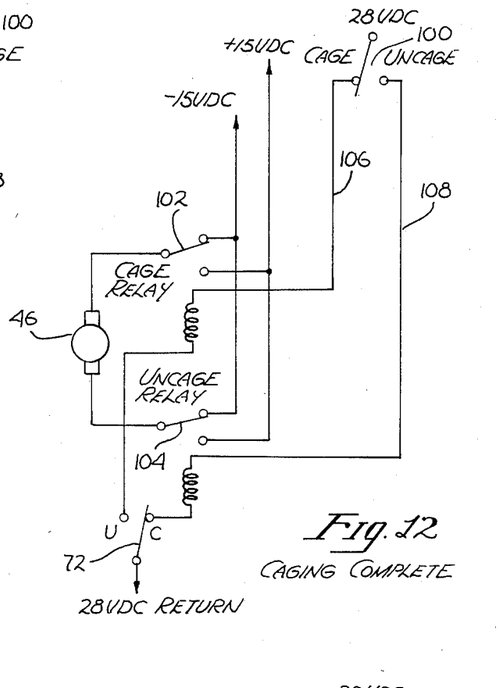

In addition to switches 72 and 100 and motor 46, the circuitry includes a cage relay 102 and an uncage relay 104, each of course controlled through the associated relay coils. In FIG. 11 the switch 72 is shown in the uncaged position, the state the switch is in when the mechanism is in fact uncaged. As shown in the figure, switch 100 has just started coupling power to the cage line 106. This activates relay 102 to change the connection of the associated motor lead to the positive power supply, relay 104 coupling the other motor lead to the negative power supply. With this connection, motor 46 drives the mechanism from the position shown in FIG. 4 through the position shown in FIG. 5 to that illustrated in FIG. 3. When the over center spring mechanism hereinbefore described enters the over center condition, but before the stop pin 80 reaches the mechanical stop hereinbefore described, switch 72 will be mechanically switched to the caged position as illustrated in FIG. 12. Now the relay 102 is activated so that both motor leads are coupled to the same negative power supply line or, stated otherwise, are shorted together through that power supply line. Since the motor is a permanent magnet motor, the shorting of the motor leads provides dynamic breaking for the motor, slowing the motor as it coasts to the mechanical stop, to be retained t that position by the over center condition of spring 60 (as aided by the dynamic breaking provided by the shorting of the motor leads together). In the quiescent caged condition illustrated in FIG. 12, it will be noted that no power is being applied to the motor or either relay. Accordingly, switch 100 may readily remain in the caged position as shown, or in an open condition as convenient.

Figures 13, 14:
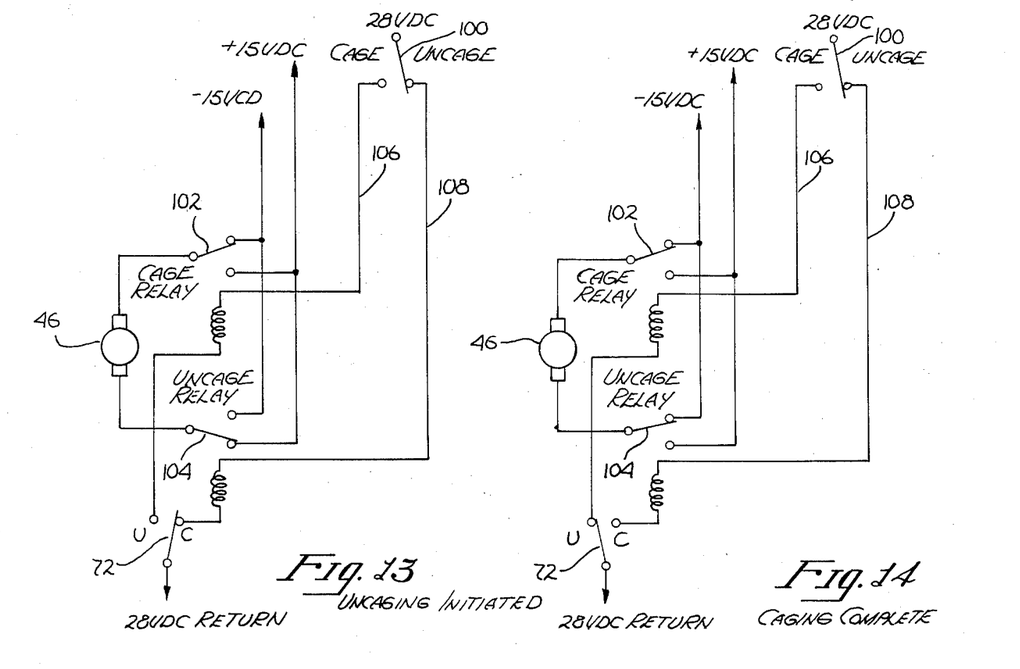

As illustrated in FIG. 13, when switch 100 is moved to the uncage position, relay 104 is activated, again coupling the motor leads across the power supply, but with an opposite polarity from the connection illustrated in FIG. 11. This drives the motor 46 in the opposite direction toward the uncaged position. Again, as the mechanism enters the overcenter condition, switch 72 is switched to the uncaged position as illustrated in FIG. 14, de-energizing relay 104 and again shorting the motor leads together through the negative power supply line to provide dynamic breaking as the mechanism coasts to the mechanical stop. Again of course in the quiescent uncaged condition, no power is applied to either motor 46 or relays 102 and 104.

The actual mechanical caging is accomplished by a slide mechanism visible in FIGS. 2 through 7. A tubular member 110 is mounted to end wall 22 by a flange 112, the tubular member having a slot 114 therein. Mounted within the tubular member is a slide member 116 having a roller 118 on the inner end thereof supported on pin 120 therethrough. The roller is aligned with the outer gimbal cam 38, as may be best seen in FIG. 5, to cam the gimbal to the cage position during the caging cycle.

A pin 122 (perhaps best seen in FIG. 2) passes through the slot 114 in tubular member 110 and through slide member 116 to extend outward from both sides of the slot. The fork 64 on spring 60 spans the tubular member 110 to entrap the pin 122 on both sides of the tubular member (see also FIGS. 3 through 5). Finally, an inner gimbal caging slide member 124 spans fork 64 and is retained in position by pin 122 to slide in unison with slide member 116, pin 122 being retained by snap rings 126 at each end thereof.

Member 124 is slotted in section 128 thereof (FIGS. 3 through 5) so as to be retained by and slideable with respect to pin 130 supported by the end cap 22. The distal end of member 124 has a fork 132 thereon (see FIGS. 6 and 7) which is engageable with the inner gimbal caging cam 42 to rotate the inner gimbal to the inner gimbal caged position.

Figure 7:
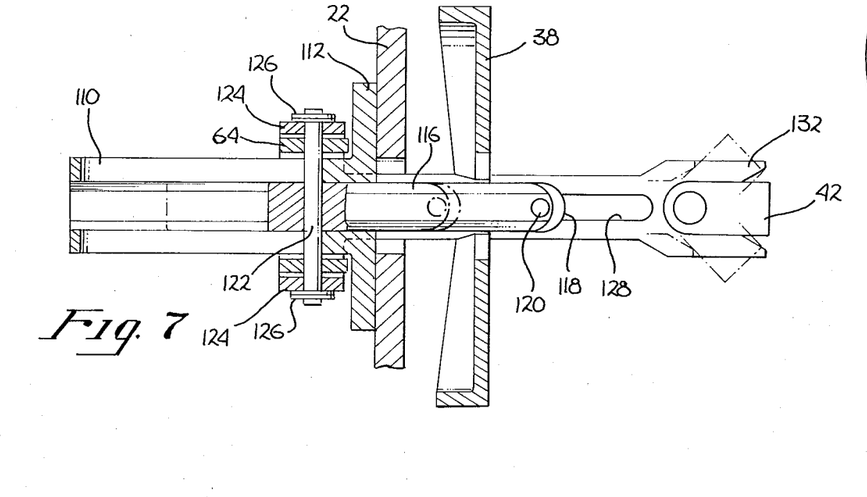
FIG. 7 is a partial cross section taken along line 7—7 of FIG. 3.

The mechanical caging sequence may be seen in FIGS. 3 through 5. In particular, the system is shown in the uncaged position in FIG. 4, wherein the outer gimbal caging roller 118 is retracted from the outer gimbal cam 38 to allow free rotation thereof and member 142 is withdrawn to the maximum position so that fork 132, radially outward for any of the associated outer gimbal structure, is also clear of the end of the inner gimbal to allow free rotation thereof within its range of travel. As caging is initiated as shown in FIG. 5, roller 118 will engage the outer gimbal cam 38 while fork 132 is still free and clear of the inner gimbal caging cam 42 to rotate the outer gimbal to the caged position. When the outer gimbal caged position is reached, as illustrated in FIGS. 3 and 7, the slide member 116 will extend through an opening in the outer gimbal cam 38, retaining the outer gimbal as the fork 132 engages the inner gimbal cam 42 and rotates the same to the fully caged position as illustrated in FIG. 3.

While the preferred embodiment of the present invention has been disclosed and described in detail herein, it will be understood by those skilled in the art that various changes in form and detail may be made therein without departing from the spirit and scope thereof.

I claim:

1. A caging system for a free gyro having an inner and an outer gimbal supported on a frame comprising
   first means for moving from a first uncaged position not obstructing the free rotation of the outer gimbal, toward a second position engaging a cam on the outer gimbal to rotate the outer gimbal to an outer gimbal caged position and locking the gimbal in the outer gimbal caged position as the first means reaches a second caged position;
   second means for moving from a first uncaged position not obstructing the rotation of the inner gimbal, toward a second position engaging a cam on the inner gimbal to rotate the inner gimbal to an inner gimbal caged position and locking the gimbal in the inner gimbal caged position as the second means reaches a second caged position;
   a rotary caging motor responsive to excitation of a first polarity to rotate toward a caged position and to excitation of a reverse polarity to rotate toward an uncaged position; and
   coupling means coupled between said rotary caging motor and said first and second means to move said first and second means to the caged position as the said rotary caging motor rotates to the caged position and to move said first and second means to the uncaged position as said rotary caging motor rotates to the uncaged position, said coupling means including a rotary crank means, and spring means coupling said rotary crank means to said first and second means, said rotary crank means being a means for rotating between first and second rotary crank positions, said first and second means reaching said first uncaged position and said second caged position as said rotary crank means approaches said first and second rotary crank positions, respectively, said rotary crank means first deflecting said spring means and then releasing at least part of the deflection as said rotary crank means finally proceeds to each of said first and second positions, whereby said spring means will elastically encourage said rotary crank means to remain in either of said first and second rotary crank positions.

2. The caging system of claim 1 further comprised of switch means of shutting of power to said rotary caging motor as said first and second means approach either the uncaged or the caged positions.

3. The caging system of claim 2 wherein said switch means includes means for connecting the said rotary caging motor for rotation in a reverse direction upon receipt of exitation of reverse polarity.

4. A caging system for a free gyro having an inner and an outer gimbal supported on a frame comprising
   first means for moving from a first uncaged position not obstructing the free rotation of the outer gimbal, toward a second position engaging a cam on the outer gimbal to rotate the outer gimbal to an outer gimbal caged position and locking the gimbal in the outer gimbal caged position as the first means reaches a second caged position;

second means for moving from a first uncaged position not obstructing the rotation of the inner gimbal, toward a second position engaging a cam on the inner gimbal to rotate the inner gimbal to an inner gimbal caged position and locking the gimbal in the inner gimbal caged position as the second means reaches a second caged position;

a rotary caging motor responsive to exitation of a first polarity to rotate toward an uncaged position; and over center spring means coupling said rotary caging motor to said first and second means for deflecting said spring means to an over center condition when said rotary caging motor reaches either the caged or uncaged position to elastically encourage said rotary caging motor to remain in that position.

* * * * *

UNITED STATES PATENT AND TRADEMARK OFFICE
CERTIFICATE OF CORRECTION

PATENT NO. : 4,807,485
DATED : 02/28/89
INVENTOR(S) : Bennett

It is certified that error appears in the above—identified patent and that said Letters Patent is hereby corrected as shown below:

| COLUMN | LINE | |
|--------|------|---|
| 05 | 06 | delete "t" insert --at-- |
| 06 | 56 | after "shutting" delete "of" insert --off-- |

Signed and Sealed this

Thirtieth Day of October, 1990

Attest:

HARRY F. MANBECK, JR.

*Attesting Officer*     *Commissioner of Patents and Trademarks*